2 Sheets--Sheet 1.

E. A. HILL.

Hotel-Annunciators and Fire-Alarms.

No. 6,575. Reissued Aug. 3, 1875.

Witnesses:
Heinrich L. Bruns.
J. L. Coburn

Inventor:
Edward A. Hill

THE NORRIS PETERS CO., PHOTO-LITHO., WASHINGTON, D. C.

E. A. HILL.

Hotel-Annunciators and Fire-Alarms.

No. 6,575. Reissued Aug. 3, 1875.

*Witnesses:*

Heinrich F. Brums.

J. L. Coburn

*Inventor:*

Edward A. Hill

THE NORRIS PETERS CO., PHOTO-LITHO., WASHINGTON, D. C.

UNITED STATES PATENT OFFICE.

EDWARD A. HILL, OF CHICAGO, ILLINOIS.

IMPROVEMENT IN HOTEL-ANNUNCIATORS AND FIRE-ALARMS.

Specification forming part of Letters Patent No. 114,007, dated April 25, 1871; reissue No. 6,575, dated August 3, 1875; application filed July 19, 1875.

DIVISION A.

*To all whom it may concern:*

Be it known that I, EDWARD A. HILL, of Chicago, in the county of Cook and State of Illinois, have invented a Hotel-Annunciator and Fire-Alarm, of which the following is a specification, reference being had to the accompanying drawings, which form a part hereof.

I find, as my invention patented in Letters Patent No. 114,007 becomes generally adopted, that there are three separate features which can be used each independently of the other two. I therefore reissue my said patent in three divisions, describing with greater particularity in each division the particular features claimed therein.

The invention particularly described and claimed in this division of my reissue consists of the pivoted armatures and blinds or curtains, which operate to conceal and reveal the number of the room at the annunciator, through which the circuit passes, which has been closed; and in the attachments which restore the tilting blind and vibrating armature.

Figure 1:
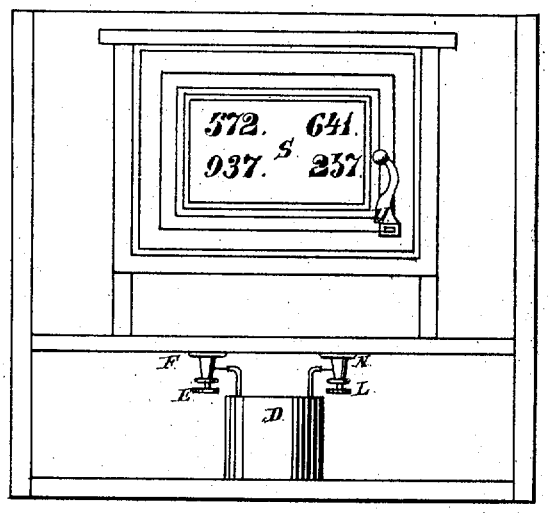
Figure 2:
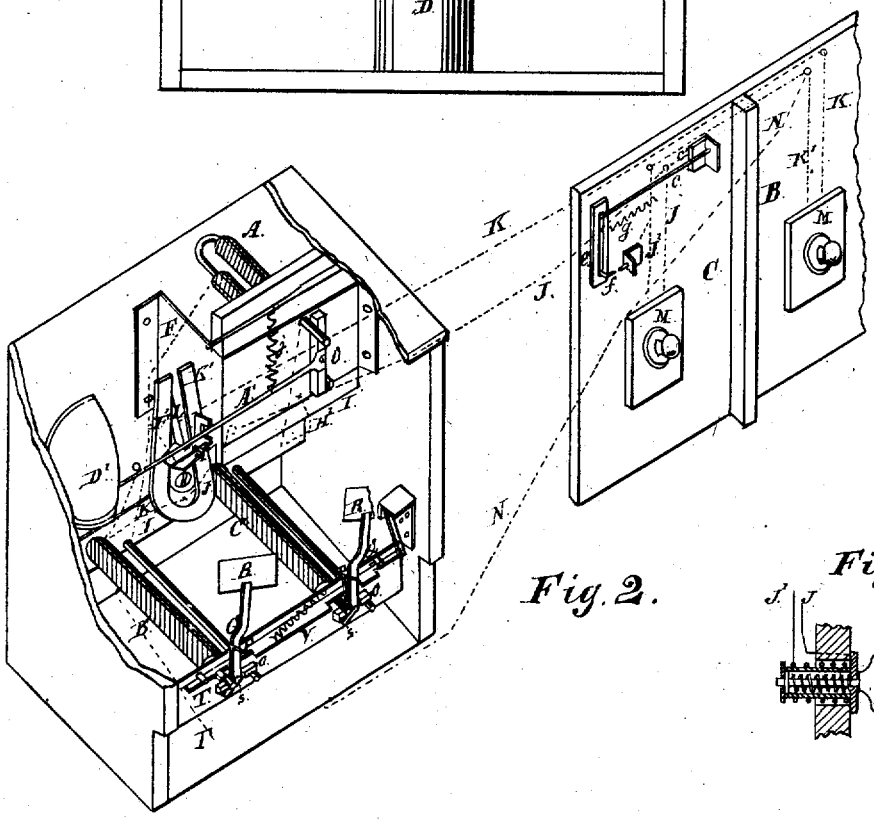
Figure 3:
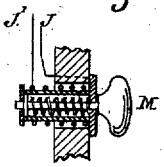
Figure 4:
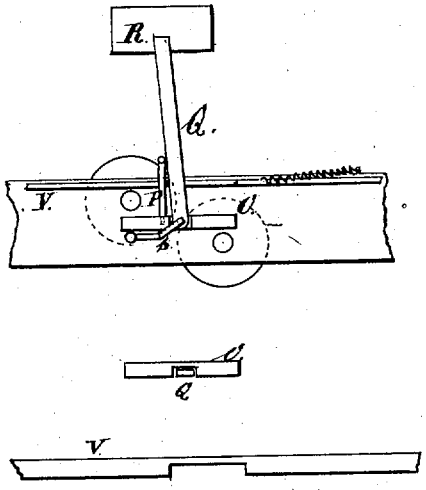

In the accompanying drawings, Figure 1 represents the front elevation of my invention; Fig. 2, a perspective view, showing the manner in which my annunciator is connected with hotel-rooms; Fig. 3, a sectional view of a key or knob used for closing the circuit in each room; and Fig. 4, an enlarged view of the vibrating armature O and tilting blind, with a detached top view of the armature and of the slide used—the blind and armature after they have been tilted.

The annunciator showing the numbers of the rooms is usually located remote from the rooms. It is necessary to extend a wire from the annunciator to each room. There must be a wire connecting all the rooms with one pole of a galvanic battery, and the annunciator must connect with the other pole.

When the room-wire which connects the annunciator with any particular room is brought in contact with the wire that leads from the rooms to one pole of the battery, an electric circuit is established through that room and the annunciator.

I use two devices in each room for joining or connecting those wires to close the circuit. One device is an ordinary key or knob to be closed by hand to close the circuit, and the other is a thermostat, which can be adjusted so that any desired degree of temperature in the room will close the circuit.

The thermostat is placed out of reach, and can be operated to close the circuit only by heat. When the key is used to close the circuit, the annunciator indicates a signal from a person in that particular room. When the thermostat closes the circuit, the annunciator indicates the room, and also gives the alarm of fire in that room, although it closes the same circuit through the annunciator that was closed by the key or knob.

I represent in Fig. 2 a part of two rooms. B designates a part of one room, and C a part of the other room. The wire K connects the room B with the annunciator, and the wire J connects the room C with the annunciator. The wire N connects both of the rooms with the battery. There is a special coil-magnet in the annunciator for each room. B′ represents the special magnet for the room B, and C′ the special magnet for the room C. There is also a coil-magnet, A, which I call a general magnet, because it is connected with all the special or room magnets. The wire H′ connects the general magnet A with the plate I, to which all the special or room magnets are connected by one end of their respective wires being connected thereto, while the other end is in the room to which each particular magnet belongs.

The magnet C′ has one end of its wire J attached to the plate I, while the other end leads to the room C, where it branches, and is attached to the key or knob M and the thermostat in the room C. The wire K of the magnet B′ has one end attached to the plate I, while its other end leads to the room B, where it branches, going to the thermostat and the key of that room, so that when either one is closed it closes the circuit through the wire K, the magnet B′, and the general magnet A, to the battery. In this way the closing of either the thermostat or the key of any room closes a circuit leading in one direction through the special wire from that room to the annunciator, the special magnet for that room in the annunciator, and the general magnet A to the battery, and in the other direction through the wire N to the opposite pole of the battery. This wire N is made to connect with the thermostat and key in each room. It is connected with the thermostat and key of the room C′ by the wire J′, and in the room B by the wire K′. O is a pivoted armature, pivoted to the plate T, and located between the poles of each coil-magnet in such a manner that when a circuit is closed through a magnet its armature will be vibrated on its pivot by the ends of the armature being drawn to the poles of the magnet. The armature of each special or room magnet is so connected with a blind or curtain, R, that when it is vibrated or turned on its pivot by being drawn to the poles of the magnet, as just described, it tilts the curtain and reveals the number of the room to which that special magnet belongs. The blind or curtain R remains tilted after the circuit is opened, and the number of the room remains exposed. There are two reasons why it remains tilted—one is, that when it is tilted its arm Q is thrown past its perpendicular, and its weight keeps it tilted, and the other is the residuary magnetism of the magnet, which holds the armature O to the poles of the magnet. The arm Q, to which the blind is attached, is pivoted on the same pivot as the armature O, and vibrates with it to tilt the blind; but to have it vibrate farther than the armature it is loose on its pivot, and the projection P, which is rigidly attached to the armature, strikes against the arm Q, and tilts it. There are stops *s*, against which the armature strikes, when restored. The arm Q is kept from tilting beyond a certain range by the notch in the slide V, which holds it. The slide V has a notch or projection, which, when the slide is moved by turning the crank U, restores the blind R and armature O to their normal position. A signal is given by a bell, D′, whenever a curtain or blind is tilted. The armature O of the general magnet A has a hammer, A′, attached to it, so that when that armature is vibrated by a circuit being closed it causes the hammer to strike the bell. This general magnet is connected with all the room or special magnets, so that when a circuit is closed through any of the special magnets it passes through the general magnet A, and causes the bell D¹ to strike and give the alarm. At the same time the blind falls, and exposes the number of the room in which the circuit was closed. The shunt which makes a continuous ringing of the bell so long as the circuit remains closed is made by the hammer-handle passing through a notch in the pivoted arm E, which carries a point that closes a circuit at I′, when the arm is thrown down by the stroke of the hammer, which is caused by the tilting of the armature O of the magnet A when the circuit is closed.

When these points are closed the magnet A is cut out of the circuit, or shunted by the wires F′ and H′, which relieves the attraction on its armature when the spring J′ raises the the hammer. The permanent magnet K′ holds the point L, which is thrown against one of its arms by the vibration of the arm E′ as the shunt-circuit is closed, and holds the shunt-circuit closed till the hammer is raised nearly its full stroke, when it strikes the upper side of the notch in the pivoted arm E′, and raises it, which opens the shunt-circuit, and throws the circuit through the magnet A again. The armature of the magnet A is immediately attracted to the poles of the magnet and vibrated, as before, carrying the hammer on another downward stroke, which again closes the shunt-circuit, when the hammer is again raised, as before. The strokes of the hammer are continued in this way as long as the circuit through the room and annunciator remains closed, and the bell is kept ringing. When there is no circuit closed through any of the rooms the spring J raises the hammer, and the point of the armature L′ is held by the magnet K′, so that the shunt-circuit is held open till the circuit is closed through the magnet A, and its armature vibrates again, which makes a stroke of the hammer, as above described.

The shunt above described also serves the additional purpose of increasing the strength of the circuit through the special magnet of the room through which the circuit is closed. When the circuit is first closed it passes through the magnet A, as above described. It is weakened by the resistance of that magnet. As soon, however, as the shunt is closed, the resistance of the magnet A is avoided, and the force of the circuit in the special magnet correspondingly increased, so that, if at first the force of the magnet was not sufficient to vibrate its armature, and tilt its blind or curtain, as above described, the increased force will always effect it. The circuit is closed in the room by the key or knob M. A spring opens the circuit as soon as the knob is released. Any ordinary key for closing a circuit may be used.

The thermostat is composed of a rod or wire, C, one end of which is connected to one branch of the wire J, at C′, and the other end is attached to the pivot-bar *e*.

This rod is made of metal that expands when heated. This rod is so attached to the pivoted bar *e* that it holds the points at *f* apart until it expands a certain distance, at which point it admits of the spring *g* drawing the points together at *f*, and closing the circuit. One end of the points at *f* is connected with the wire J′, which leads to the wire N. By closing these points at *f* the circuit is closed through the room and the annunciator, the same as by closing the key or knob M. Any ordinary thermostat may be used.

If the room becomes sufficiently hot to expand the wire *c*, and the wire can be so constructed as to expand and close the circuit at any desired increase of temperature, the circuit becomes permanently closed till the temperature is diminished and a constant alarm is given at the office by the continued ringing of the bell D′, as above described. A single signal is given by the occupant of the room closing the key or knob M and releasing it. This indicates a call for a servant. A continuous ringing is an alarm of fire in the room indicated.

The dial S of my annunciator is an ordinary glass, covered on the inside with an opaque substance—such as paint or paper—excepting the outlines of the figure indicating the numbers of the various rooms, they being made in the opaque substance, and can be seen through the glass. The blinds behind the figures, being of the color of the opaque covering, make the figures obscure till the blinds are tilted from behind the figures, as above described.

This is a cheap, simple way of making the dial, and shows the numbers of the rooms from which the signal is given very distinctly.

By pivoting the armatures O they can be vibrated without overcoming a counter-weight or the force of a spring, which has heretofore been objectionable on account of the electric force required to move the armature.

I claim—

1. The combination of the pivoted armature O and tilting blinds or curtains R, when constructed and operating in an annunciator, substantially as and for the purposes specified.

2. The dial S′, provided with transparent figures, in combination with the shifting blind, as and for the purpose as specified.

3. The slide-bar V, for restoring the curtain or blind R or the pivoted armature O, as described.

EDWARD A. HILL.

Witnesses:
HEINRICH F. BRUNS,
J. L. COBURN.